US011051005B2

(12) United States Patent
Ho et al.

(10) Patent No.: US 11,051,005 B2
(45) Date of Patent: Jun. 29, 2021

(54) VIRTUAL REALITY DEVICE AND OPERATION METHOD OF VIRTUAL REALITY DEVICE

(71) Applicant: SUZHOU RAKEN TECHNOLOGY LIMITED, Jiangsu (CN)

(72) Inventors: Che-Chia Ho, New Taipei (TW); Chia-Wei Lin, New Taipei (TW)

(73) Assignee: SUZHOU RAKEN TECHNOLOGY LIMITED, Suzhou (CN)

( * ) Notice: Subject to any disclaimer, the term of this patent is extended or adjusted under 35 U.S.C. 154(b) by 0 days.

(21) Appl. No.: 16/197,973

(22) Filed: Nov. 21, 2018

(65) Prior Publication Data

US 2019/0158818 A1 May 23, 2019

(30) Foreign Application Priority Data

Nov. 21, 2017 (TW) .................................. 106140315

(51) Int. Cl.
*H04N 13/359* (2018.01)
*H04N 13/139* (2018.01)
(Continued)

(52) U.S. Cl.
CPC ........... *H04N 13/359* (2018.05); *G06F 3/012* (2013.01); *G09G 5/363* (2013.01); *H04N 13/139* (2018.05);
(Continued)

(58) Field of Classification Search
CPC .......... G06F 3/012; G06F 3/013; G06F 3/011; G06F 3/04815; G06F 2203/012–015;
(Continued)

(56) References Cited

U.S. PATENT DOCUMENTS

| 6,637,883 | B1 * | 10/2003 | Tengshe | A61B 3/113 351/210 |
| 2001/0006376 | A1 | 7/2001 | Numa | |
| 2014/0140677 | A1 * | 5/2014 | Cho | H04N 5/23229 386/230 |
| 2015/0153826 | A1 * | 6/2015 | Ballard | G02B 27/0093 345/633 |

(Continued)

FOREIGN PATENT DOCUMENTS

| CN | 103018903 | 4/2013 |
| CN | 103392343 | 11/2013 |

(Continued)

*Primary Examiner* — Nitin Patel
*Assistant Examiner* — Amen W. Bogale
(74) *Attorney, Agent, or Firm* — Nixon Peabody LLP

(57) ABSTRACT

A virtual reality device and the operation method of virtual reality device, and the method includes: the virtual reality device displays an image content according to a corresponding viewing angle of a user; and when the time of virtual reality device detects that the viewing elevation angle is greater than a predetermined angle for a time period which exceeds a predetermined time period, the virtual reality device enters a locking mode; in the locking mode, the virtual reality device displays the image content with a fixed main field, and the virtual reality device constrains the viewing angle of the image content from the movement or rotation of the user. The present invention can determine whether to enter the locking mode according to a preset condition, and provide the main image content of the fixed field of view in the locking mode in order to achieve user convenience and save power.

10 Claims, 3 Drawing Sheets

(51) Int. Cl.
*H04N 13/332* (2018.01)
*H04N 13/366* (2018.01)
*H04N 13/344* (2018.01)
*G09G 5/36* (2006.01)
*G06F 3/01* (2006.01)

(52) U.S. Cl.
CPC ......... *H04N 13/332* (2018.05); *H04N 13/344* (2018.05); *H04N 13/366* (2018.05); *G09G 2320/028* (2013.01); *G09G 2330/021* (2013.01); *G09G 2354/00* (2013.01)

(58) Field of Classification Search
CPC .... G06F 1/163; G06F 1/1637; G06F 2111/18; G06F 3/016; H04N 13/332; H04N 13/139; H04N 13/279; H04N 13/344; H04N 13/366; H04N 13/283; H04N 7/157; G02B 27/017; G02B 27/0176; G02B 27/0178; G02B 27/01; G02B 27/0093; G02B 23/125; G02B 2027/0178; G02B 2027/0187; G06T 19/006; G09G 2330/021; A63F 2300/8082; A61B 3/113
See application file for complete search history.

(56) References Cited

U.S. PATENT DOCUMENTS

| | | | | |
|---|---|---|---|---|
| 2017/0046881 | A1* | 2/2017 | Kuribara | G06F 3/0346 |
| 2017/0116479 | A1* | 4/2017 | Ouchi | G06K 9/00671 |
| 2018/0350119 | A1* | 12/2018 | Kocharlakota | G06F 3/012 |
| 2018/0373327 | A1* | 12/2018 | Todeschini | G02B 27/0093 |
| 2019/0005884 | A1* | 1/2019 | Yoo | G09G 3/3266 |

FOREIGN PATENT DOCUMENTS

| | | |
|---|---|---|
| CN | 105630129 | 6/2016 |
| CN | 105929926 | 9/2016 |
| CN | 106292994 | 1/2017 |
| CN | 106358036 | 1/2017 |
| CN | 106485790 | 3/2017 |
| CN | 106886287 | 6/2017 |
| CN | 107092359 | 8/2017 |
| CN | 107239140 | 10/2017 |
| JP | 2007219116 | 8/2007 |
| JP | 2017054201 | 3/2017 |
| TW | 201716827 | 5/2017 |

* cited by examiner

VIRTUAL REALITY DEVICE AND OPERATION METHOD OF VIRTUAL REALITY DEVICE

TECHNICAL FIELD

The present invention relates to a virtual reality device and operation method thereof, particularly to a virtual reality device and operation method thereof convenient to user.

BACKGROUND OF INVENTION

Virtual reality (VR), also known as the virtual environment, mainly uses the computer stimulation to generate a three-dimensional visual virtual world and it also uses the other sensory stimulations sometimes to make the users feel immersive and explore in the virtual three-dimensional world. That is to say, the virtual reality device may generate a corresponding image according to the position and the viewing angle of the user, so that the user feels the sense of presence during the movement thereof.

In order to give the user wearing the virtual reality device a wider viewing angle, the virtual reality device usually is provided with helmet or goggles to cover eyes of the user for the purpose of avoiding distribution from surrounding senses. However, in actual operation, the weight of the virtual reality device and the easily shaken image often bring the discomfort to the user. These disadvantages are particularly noticeable when the device is used for a long time. In addition, the virtual reality device often needs to display the frame at a high frame rate among the change of user's viewing angle, for example, 60 frames/second, to reduce the user's dizziness. However, when the user performs a long-term usage behavior, the virtual reality device still requires the huge operation energy to maintain the frame even if the user maintains the static posture without moving or rotating the viewing angle. That is the operation time of stand-alone power virtual reality device is limited to the huge power consumption.

Therefore, it's a problem for the present invention to solve the deficiencies of the above-mentioned prior art.

DISCLOSURE OF THE INVENTION

The object of the present invention is to provide a virtual reality device and the operation method of virtual reality device.

In order to achieve the above object, the present invention applies the following technical solution:

The operation method of virtual reality device, comprising steps of:
the virtual reality device displays an image content according to a corresponding viewing angle of a user; and
when the virtual reality device detects a viewing elevation angle is greater than a predetermined angle for a time period and the time period exceeds a predetermined time, the virtual reality device enters a locking mode; in the locking mode, the virtual reality device displays the image content with a fixed main eyesight, and constrains the viewing angle of the image content from the movement or rotation of the user.

It is an object of the invention to provide a virtual reality device and operation method thereof.

To achieve the above object, the present invention provides an operation method of virtual reality device, comprising: displays an image content by the virtual reality device according to a corresponding viewing angle of a user, and enters a locking mode when the virtual reality device detects that a viewing elevation angle is greater than a predetermined angle for a time period, and the time period exceeds a predetermined time period. In the locking mode, the virtual reality device displays the image content with a fixed main eyesight, and constrains the viewing angle of the image content from the movement or rotation of the user.

To achieve another object, the present invention provides an operation method of the virtual reality device, comprising: displays an image content by the virtual reality device according to a corresponding viewing angle of a user, and displays the image content with a fixed main eyesight when the virtual reality device enters a locking mode selected by the user. In the locking mode, the virtual reality device reduces the frame rate of the displayed image content.

To achieve one another object, the present invention provides a virtual reality device, comprising: a display module displaying a left eye image and a right eye image, a sensing unit sensing a head movement of a user wearing the virtual reality device, a graphic processing unit rendering the left eye image and the right eye image in real time to the displayed module according to eyesight of the user and according to the data sensed by the sensing unit; and a processing unit determining whether a viewing elevation angle of the user is greater than a predetermined angle for a time period, and the time period exceeds a predetermined time period according to the data sensed by the sensing unit. When the viewing elevation angle is greater than the predetermined angle for the time period, and the time period exceeds the predetermined time period, the virtual reality device enters a locking mode. In the locking mode, the virtual reality device displays an image content with a fixed main eyesight

In the above described drawings: 100. Virtual reality device; 110. Display module; 120. Sensing unit; 130. Graphic processing unit; 140. Processing unit; K. Three-dimensional space; S1. Area; S2. Area; 200. Method; S210 to S296. Steps.

SPECIFIC EMBODIMENT

With reference to the accompanying drawings and embodiment, the present invention will be described in detail.

Figure 1:
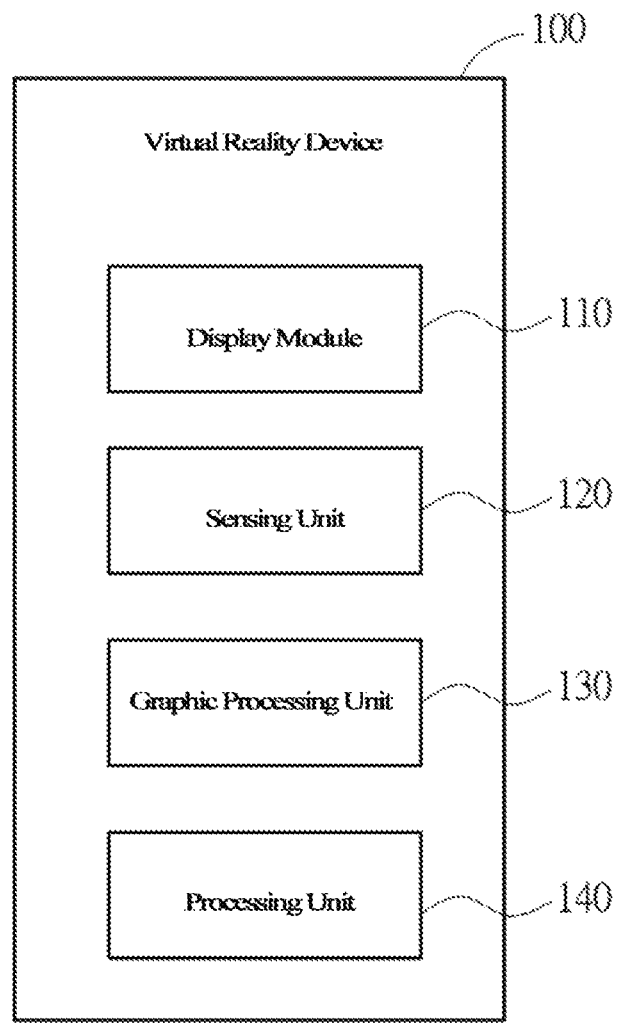
FIG. 1 is a schematic diagram of an embodiment of the virtual reality device of the present invention.

Embodiment: FIG. 1 is a schematic diagram of an embodiment of the virtual reality device 100 of the present invention. The virtual reality device 100 includes a display module 110, a sensing unit 120, a graphic processing unit 130, and a processing unit 140. The sensing unit 120 may sense a head movement or motion of the user when the user wears the virtual reality device 100. The graphic processing unit 130 may be, for example, a graphic processing unit (GPU) capable of rendering three-dimensional graphics and renders the left eye image and the right eye image in real time according to eyesight of the user and according to the data sensed by the sensing unit 120, and displays the left eye image and the right eye image through the display module 110. In some embodiments of the present invention, the display module 110 has two display panels, which respectively display a left eye image and a right eye image to provide the user with a visual effect having a three-dimensional sense of presence. In some embodiments, the display module 110 has only one display panel, and the display area of the display panel includes a left-eye image area and a right-eye image area. The processing unit 140 may be, for example, a central processing unit (CPU). The virtual reality device 100 can be a variety of head mounted display (HMD) devices and provided with functions of: independently generating a virtual reality image, connecting an external computing processing device to receive the video signal for displaying, or a mobile computing device such as a mobile phone is detachably mounted on the head mounted optical mechanism, and the virtual reality image is generated by the display module 110 of the mobile phone, the sensing unit 120, the graphic processing unit 130, and the processing unit 140.

Figure 2:
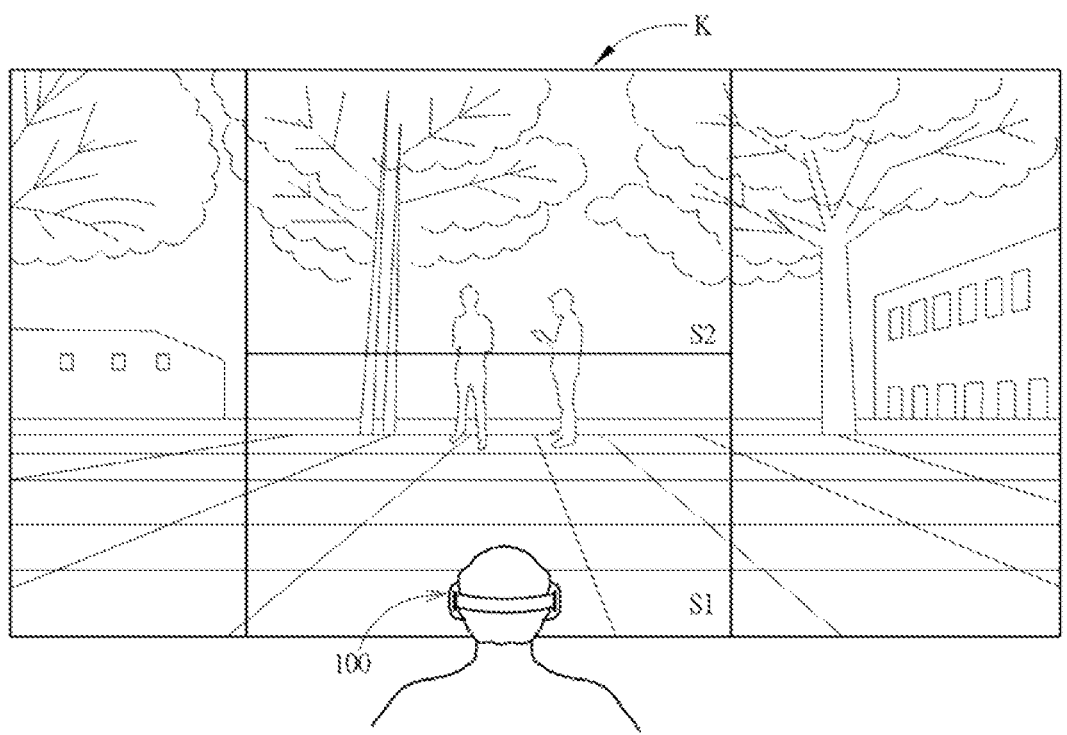
FIG. 2 is a use scenario diagram of the virtual reality device of FIG. 1.

FIG. 2 is a use scenario diagram of an embodiment of the virtual reality device 100 of the present invention. In FIG. 2, the user is wearing the virtual reality device 100 to view the image content of the three-dimensional space K in the virtual reality movie, and when the viewing angle of the user changes, the virtual reality device 100 displays a corresponding image content according to a viewing angle of a user. For example, when the user views at a viewing angle lower than the horizontal angle, the virtual reality device 100 may display the image content of the area S1 in the three-dimensional space K; when the user views at a viewing angle higher than the horizontal angle, the virtual reality device 100 may display the image content of the area S2 in the three-dimensional space K.

However, in fact, when a user views a movie using the virtual reality device 100, the key content of the movie is often maintained in a fixed main eyesight of view. In addition, the shaking of the image often causes dizziness of the user, so the user rarely rotates his vision continuously during operation. Moreover, considering the weight of the virtual reality device 100, the user often feels tired when the user views the main movie content maintaining a fixed horizontal viewing angle for a long time period. However, once the user takes a lying posture to reduce the pressure of the neck, the user could not see the main image content of the horizontal viewing angle when the viewing angle rotates in the lying posture.

In order to be closer to the user's use habits, the processing unit 140 of the virtual reality device 100 may determine whether the viewing angle of the user is greater than a predetermined angle for a time period, and whether the time period exceeds a predetermined time period according to the data sensed by the sensing unit 120. When the time period exceeds the predetermined time period, the virtual reality device 100 enters a locking mode. In the locking mode, the virtual reality device 100 may display the image content with a fixed main eyesight of view, the main eyesight of displayed image content will not be changed by the according to the viewing angle of the user in real time. That is, in the locking mode, the virtual reality device 100 constrains the viewing angle of the image content form the movement or rotation of the user. In this way, not only the user's operation and viewing can be facilitated, but also the image rendering calculation of the virtual reality device 100 can be simplified to save the power consumption, and the use time of the virtual reality device 100 can be prolonged.

Figure 3:
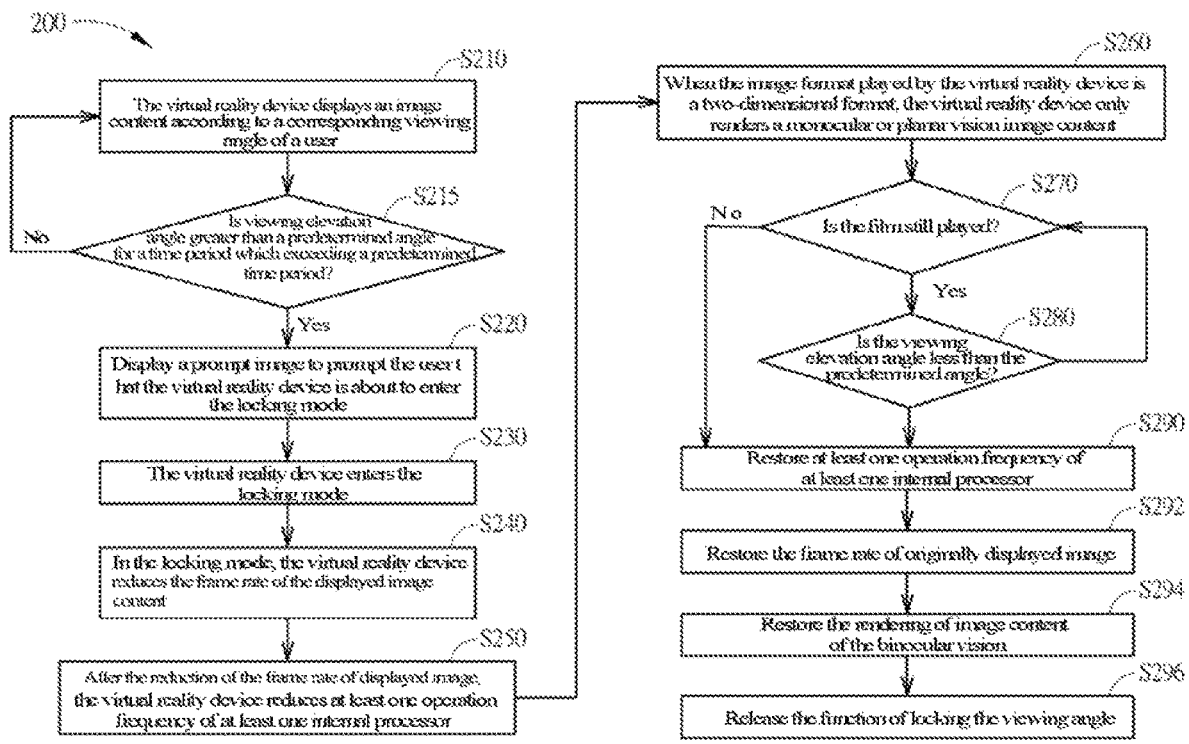
FIG. 3 is a flow chart of the operation method of the virtual reality device of FIG. 1.

FIG. 3 is the flow chart of the operation method 200 of an embodiment of the virtual reality device 100 of the present invention, and the operation method 200 includes the steps from S210 to S296.

S210: The virtual reality device 100 displays a corresponding image content according to a viewing angle of a user;

S215: The virtual reality device detects whether the viewing elevation angle is greater than the predetermined angle for a time period exceeding the predetermined time; if yes, it executes the step S220; if no, it moves to step S210;

S220: Displaying a prompt image to prompt the user that the virtual reality device 100 is about to enter the locking mode.

S230: The virtual reality device 100 enters a locking mode, and in the locking mode, the virtual reality device 100 fixedly displays the image content with a fixed main eyesight of view;

S240: In the locking mode, the virtual reality device 100 reduces the frame rate of the displayed image content.

S250: After the virtual reality device 100 reduces the frame rate of the displayed image content, the virtual reality device 100 reduces at least one operation frequency of at least one internal processor of the virtual reality device 100;

S260: In the locking mode, when the image format of the image content displayed by the virtual reality device 100 is a two-dimensional format, the virtual reality device 100 only renders a monocular vision image content;

S270: Determines whether the film is still played; if yes, moves to the step S280; if no, moves to the step S290 to exit the locking mode;

S280: Does the virtual reality device 100 detects that the viewing elevation angle is less than the predetermined angle? If yes, moves to the step S290 to exit the locking mode, otherwise moves to the step S270;

S250: The virtual reality device 100 restores at least one operation frequency of at least one internal processor;

S292: The virtual reality device 100 restores the frame rate of originally displayed image content;

S294: The virtual reality device 100 restores the rendering of image content of the binocular vision;

S296: The virtual reality device 100 releases the function of locking the viewing angle.

In the step S210, the virtual reality device 100 may be worked in a general operation mode, that is, the virtual reality device 100 may display the image content of the corresponding view according to the viewing angle of the user. When the user turns the head, the sensing unit 120 of the virtual reality device 100 also detects the user's motion, and the graphic processing unit 130 provides a corresponding image content according to the sensed motion. Thus the eyesight of view displayed by the display module 110 also changes with the rotation angle accordingly. However, when the virtual reality device 100 detects that the viewing elevation angle is greater than a predetermined angle for a time period which exceeds the predetermined time period, it might indicate that the user may not intend to continue to rotate the viewing angle, but wishes to view the image content of the main field of view in a resting posture. Then, the virtual reality device 100 may display a prompt image to prompt the user that the virtual reality device 100 is about to enter the locking mode in the step S220. For example, the virtual reality device 100 may further provide a target shown on the display module 120 to be aligned by the user to maintain the elevation angle. The virtual reality device 100 may also start counting down when the elevation angle for the time period is greater than a certain time period, and display the countdown number and prompt text repeatedly in the image. After the countdown is completed, the virtual reality device 100 enters the locking mode in the step S230. If the user changes the posture during the countdown or the prompting period so that the elevation angle is less than the predetermined angle, the virtual reality device 100 stops the countdown or the prompt, and returns to the step S210.

In order to make the virtual reality device 100 display the image content of the corresponding vision according to the user's viewing angle, the virtual reality device 100 is generally provided with a sensing unit 120 detecting the viewing angle, such as a gyroscope. In this case, the virtual reality device 100 may determine whether the viewing angle of the user exceeds a predetermined angle based on the sensing unit 120 for the time period more than the predetermined time period. For example, if the horizontal viewing angle is 0 degree, the predetermined angle set by the system may be any angle or interval of 35 to 90 degrees, and the predetermined time period may be, for example, any time or interval of 2 to 9 seconds. However, the present invention is not limited thereto.

In addition, in some embodiments of the present invention, the method 200 may also omit the step S220, and when the user's viewing elevation angle is greater than the predetermined angle for the time period, and the time period exceeds the predetermined time period, the virtual reality device 100 may enter the locking mode directly. In the locking mode, the displayed image viewing angle doesn't change with the user's head movement. For the purpose to allow the user to select functions, such as video playback, of the virtual reality device 100 in locking mode, graphical interface and/or the cursor may be shown in the display image content when the user turns the head to be selected by the user. Thus, the user may control the virtual reality device 100 to perform specific function by selecting the graphical interface or cursor in the locking mode, and the corresponding functions include pause, playback, forward, reverse, jog shuttle to next part or time, jog shuttle to previous part or time and it may also include functions provided by the original user interface of the virtual reality device 100, as well as function of releasing the locking mode or changing the viewing angle of locking.

After entering the locking mode, the virtual reality device 100 displays the image content with a fixed eyesight of view without the need of displaying the image at a high frame rate. Therefore, in the step S240, the virtual reality device 100 may further reduce the frame rate of the played image after entering the locking mode, for example, from 60 frames/second in the normal mode to 30 frames/second.

After the frame rate of the played image is reduced, since the computing requirement of the virtual reality device 100 is also reduced accordingly, the virtual reality device 100 may further reduce the operating frequency of at least one internal processor of the virtual reality device in the step S250, for example, the processing unit 140 of virtual reality device 100, graphic processing unit 130, double data rate (DDR) memory or the operation frequency of any combination of above three items. As a result, the power consumption of the virtual reality device 100 can be further reduced.

Furthermore, in order to present a three-dimensional effect in the normal mode, the virtual reality images of the left-eye screen and the right-eye screen must be rendered separately to generate a three-dimensional effect from the parallax image. However, if the currently displayed image format is a two-dimensional general movie format, the virtual reality device 100 displays the same image to both eyes, so there is no need to repeatedly render and draw the same image content to provide to the left-eye screen and the right-eye screen. That is to say, in this case, the virtual reality device 100 may reduce the times of rendering and drawing the image in the step S260, and instead provide the image content of the monocular or planar vision to the screens of both eyes. In this step, the virtual reality device 100 detects the content of the displayed image format, and automatically adjusts the times of image processing such as rendering to reduce the computing and reduce the power consumption.

In addition, the present invention does not limit the execution order of the steps from S230 to S260 after entering the locking mode. In other embodiments of the present invention, the execution order of the steps from S230 to S260 may be changed or executed simultaneously without affecting the effects of the present invention.

In the step S270, if it is determined that the movie is still being played, the method 200 proceeds to the step S280 to further determine whether it is necessary to exit the locking mode. However, if the displayed movie is finished completely, the virtual reality device 100 may exit the locking mode, such as the steps from S290 to S296 may be directly executed to exit the locking mode. In the step S280, when the virtual reality device 100 detects that the viewing elevation angle is less than the predetermined angle, the steps from S290 to S296 may be executed to exit the locking mode, otherwise it moves to the step S270 to continuously determine whether it's necessary to exit the locking mode. Furthermore, the present invention does not limit the execution order of steps S270 and S280. In other embodiments of the present invention, the execution order of steps S270 and S280 may be reversed or determined in parallel.

Furthermore, the present invention does not limit way illustrated in the steps S270 and S280 to be the conditions for exiting the locking mode. In some embodiments of the present invention, the virtual reality device 100 may also determine whether to exit the locking mode based on the other determination conditions according to the user's habits, or provide a menu to let the user exit the locking mode in advance. For example, the virtual reality device 100 uses the result of detecting brain waves or eyeball activities to determine whether the user has fallen asleep, detects whether an object or a person is approaching the user, or detects whether a message transmitted to the user is received, etc., to determine whether it's going to exit the locking mode according to user settings.

In the steps from S290 to S296, the virtual reality device 100 can first restore the operation frequency of the internal processor, restore the frame rate of the originally played image, and restore the image content of the binocular vision, and then release the function of locking the viewing angle, so that the virtual reality device exits the locking mode. In addition, the present invention does not limit the execution order of the steps from S290 to S296. In other embodiments of the present invention, the execution order of the steps from S290 to S296 may be changed or executed simultaneously.

In addition, in the embodiment of FIG. 3, the virtual reality device 100 determines whether to enter the locking mode according to the viewing angle of the user. However, in other embodiments of the present invention, the virtual reality device 100 may also provide a menu or change to different judgment conditions according to the user's habits to enable the user to select whether to enter the locking mode. Once it enters the locking mode, the operation can still be performed according to steps S240 to S260 of FIG. 3, so that the user can view the image content in a relaxed state, and at the same time, the computation burden of virtual reality device 100 could be reduced and the power consumption can be reduced.

In summary, the operation method of the virtual reality device provided by the embodiment of the present invention may determine whether to enter the locking mode according to a preset condition, such as a viewing angle of the user and it provides the main image content with fixed eyesight of view in the locking mode and even further reduces the frame rate and the operation frequency of the internal processor, in order to achieve user convenience and save power.

It should be noted that the above described embodiments are only for illustration of technical concept and characteristics of present invention with purpose of making those skilled in the art understand the present invention, and thus these embodiments shall not limit the protection range of present invention. The equivalent changes or modifications according to spiritual essence of present invention shall fall in the protection scope of present invention.

What is claimed is:

1. An operation method of a virtual reality device, comprising:
    displaying image content by the virtual reality device according to a corresponding viewing angle of a user; and
    entering a locking mode when the virtual reality device detects that a viewing elevation angle is greater than a predetermined angle for a time period, and the time period exceeds a predetermined time period;
    wherein, in the locking mode, the virtual reality device displays the image content with a fixed main eyesight and constrains the viewing angle of the image content from movement or rotation of the user.

2. The method according to claim 1, further comprising:
    when detecting the viewing elevation angle is greater than the predetermined angle for the time period, and the time period exceeds the predetermined time period, the virtual reality device displays a prompt image to prompt the user that the virtual reality device is about to enter the locking mode.

3. The method according to claim 1, wherein the virtual reality device reduces a frame rate of the displayed image content when entering the locking mode.

4. The method according to claim 3, wherein in the locking mode, after reducing the frame rate of the displayed image content, the virtual reality device reduces at least one operation frequency of at least one internal processor of the virtual reality device.

5. The method according to claim 1, wherein in the locking mode, when an image format of the image content is a two-dimensional format, the virtual reality device only renders a monocular or planar vision image content.

6. The method according to claim 1, wherein when the virtual reality device completes displaying the image content, the virtual reality device exits the locking mode.

7. The method according to claim 1, wherein when the virtual reality device detects that the viewing elevation angle is less than the predetermined angle, the virtual reality device exits the locking mode.

8. An operation method of a virtual reality device, comprising:
    displaying image content by the virtual reality device according to a corresponding viewing angle of a user, the image content spanning an entirety of a display module of the virtual reality device;
    displaying the image content with a fixed main eyesight when the virtual reality device enters a locking mode selected by the user; and
    in the locking mode, reducing a frame rate of the displayed image content, wherein hi the locking mode, after reducing the frame rate of the displayed image content, the virtual reality device reduces at least one operation frequency of at least one internal processor of the virtual reality device.

9. The method according to claim 8, wherein in the locking mode, when the image format of the image content is a two-dimensional format, the virtual reality device only renders a monocular or planar vision image content.

10. A virtual reality device, comprising:
    a display module configured to display a left eye image and a right eye image;
    a sensing unit configured to sense a head movement of a user wearing the virtual reality device;
    a graphic processing unit configured to render the left eye image and the right eye image in real time to the display module according to eyesight of the user and according to data sensed by the sensing unit; and
    a processing unit configured to determine whether a viewing elevation angle of the user is greater than a predetermined angle for a time period, and whether the time period exceeds a predetermined time period according to the data sensed by the sensing unit;
    wherein, when the viewing elevation angle is greater than the predetermined angle for the time period, and the time period exceeds the predetermined time period, the virtual reality device is configured to enter a locking mode;
    wherein, in the locking mode, the display module is configured to display an image content with a fixed main eyesight.

* * * * *

UNITED STATES PATENT AND TRADEMARK OFFICE
CERTIFICATE OF CORRECTION

| | |
|---|---|
| PATENT NO. | : 11,051,005 B2 |
| APPLICATION NO. | : 16/197973 |
| DATED | : June 29, 2021 |
| INVENTOR(S) | : Che-Chia Ho et al. |

Page 1 of 1

It is certified that error appears in the above-identified patent and that said Letters Patent is hereby corrected as shown below:

In the Claims

At Column 8, Line 19 (Claim 8, Line 11), please delete "wherein hi" and insert --wherein in-- therefor.

Signed and Sealed this
Ninth Day of November, 2021

Drew Hirshfeld
*Performing the Functions and Duties of the
Under Secretary of Commerce for Intellectual Property and
Director of the United States Patent and Trademark Office*